United States Patent
Shimizu et al.

(12)

(10) Patent No.: US 6,265,107 B1
(45) Date of Patent: Jul. 24, 2001

(54) BINDER FOR RECHARGEABLE BATTERY WITH NONAQUEOUS ELECTROLYTE AND BATTERY ELECTRODE DEPOLARIZING MIX PREPARED USING THE SAME

(75) Inventors: Tetsuo Shimizu; Yoshihide Higashihata; Takayuki Nakamura; Tadashi Ino; Kenji Ichikawa, all of Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/331,057

(22) PCT Filed: Oct. 6, 1997

(86) PCT No.: PCT/JP97/03576

§ 371 Date: Jun. 16, 1999

§ 102(e) Date: Jun. 16, 1999

(87) PCT Pub. No.: WO98/27605

PCT Pub. Date: Jun. 25, 1998

(30) Foreign Application Priority Data

Dec. 16, 1996 (JP) .................................... 8-335872

(51) Int. Cl.[7] ..................................... H01M 4/62
(52) U.S. Cl. ...................................... 429/217; 429/231.95
(58) Field of Search ............................... 429/231.95, 217

(56) References Cited

U.S. PATENT DOCUMENTS 5,609,975 * 3/1997 Hasegawa et al. .................. 429/217
5,756,230 * 5/1998 Gao et al. ........................... 429/192

FOREIGN PATENT DOCUMENTS

| 6-172452 | 6/1994 | (JP) | ............... C08F/214/22 |
| 7-201316 | 8/1995 | (JP) | ............... H01M/4/02 |
| 8-4007 | 1/1996 | (JP) | ............... H01M/4/62 |
| 9-180725 | 7/1997 | (JP) | ............... H01M/4/62 |
| 9-199134 | 7/1997 | (JP) | ............... H01M/4/62 |
| 9-320607 | 12/1997 | (JP) | ............... H01M/4/62 |

OTHER PUBLICATIONS

International Preliminary Examination Report for PCT/JP97/03576. (no date).

International Search Report.

International Search Report (Dec. 1997).

* cited by examiner

Primary Examiner—Gabrielle Brouillette
Assistant Examiner—M. Wills
(74) Attorney, Agent, or Firm—Sughrue, Mion, Zinn, Macpeak & Seas, PLLC

(57) ABSTRACT

To provide a binder for secondary battery using non-aqueous electrolyte which is soluble in usual organic solvents, does not swell in a non-aqueous electrolyte and besides enhances battery performance. As the binder, a copolymer comprising 50 to 80% by mole of vinylidene fluoride, 17 to 50% by mole of tetrafluoroethylene and less than 3% by mole of a monomer copolymerizable therewith is used.

16 Claims, No Drawings

BINDER FOR RECHARGEABLE BATTERY WITH NONAQUEOUS ELECTROLYTE AND BATTERY ELECTRODE DEPOLARIZING MIX PREPARED USING THE SAME

TECHNICAL FIELD

The present invention relates to a binder for secondary battery using non-aqueous electrolyte and a battery electrode composition prepared by using the binder.

BACKGROUND ART

Recently demand for electric and electronic apparatuses which are small-sized and portable, such as audio tape recorder, camera built-up video tape recorder, personal computer and portable phone has been increasing more and more. As a result of such an increased demand, high performance secondary battery which is small-sized, light and rechargeable has come to be required. In addition to conventional lead storage batteries and nickel-cadmium batteries, various new batteries of nickel-metal hydride type and lithium ion type have been commercialized. Among them, nickel-metal hydride secondary batteries employing alkaline electrolyte have problems remaining unsolved, that is to say, a voltage is low, energy density cannot be increased and a self-discharge is large. On the other hand, lithium ion secondary batteries employing non-aqueous electrolyte have merits such as a high voltage, high energy density, small self-discharge and extra-light weight, and are expected to be developed greatly in the future.

A point for enhancing energy density of the lithium ion secondary batteries is a technique for producing an electrode thereof. In case where a negative electrode is produced by using a carbonaceous material such as coke, carbon or the like as an active material for negative electrode, first the carbonaceous material is powdered, and then dispersed in a solvent together with a binder to prepare a negative electrode composition. After the composition is coated on a current collector for negative electrode, the solvent is removed by drying and the coated current collector is rolled, thus giving the negative electrode. Hereinafter a carbonaceous material merely storing and releasing a lithium ion is also called an active material. Similarly a positive electrode is produced, for example, by powdering a lithium-containing oxide as an active material for positive electrode, dispersing the powder in a solvent together with a conductive agent and binder to prepare a positive electrode composition, coating the composition on a current collector for positive electrode, removing the solvent by drying and then rolling the coated current collector. As a binder for lithium ion secondary batteries, polyvinylidene fluoride has been used widely. For example, JP-A-4-249859 discloses a technique for producing electrode sheets, in which a lithium-containing oxide such as $LiCoO_2$ as an active material for positive electrode and graphite as a conductive agent are mixed with polyvinylidene fluoride to prepare a positive electrode composition, the obtained composition is dispersed in N-methylpyrrolidone to give a slurry, the slurry is applied onto an aluminum foil current collector for positive electrode and then the coated current collector is dried and compression-molded with a roller press, thus giving a positive electrode sheet, and separately in which a carbonaceous material as an active material for negative electrode is mixed with polyvinylidene fluoride to prepare a negative electrode composition, the obtained composition is dispersed in N-methylpyrrolidone to give a slurry, the slurry is coated on a copper foil current collector for negative electrode and then the coated current collector is dried and compression-molded with a roller press, thus giving a negative electrode sheet. However, a solvent of polyvinylidene fluoride is limited to expensive specific organic solvents having a high boiling point, such as N-methylpyrrolidone, dimethylformamide and dimethylacetamide. Therefore it takes a lot of time to dry the solvent at the time of producing an electrode sheet and production cost increases. Also polyvinylidene fluoride is apt to swell in an organic solvent used for a non-aqueous electrolyte of lithium ion secondary battery, such as propylene carbonate, ethylene carbonate, diethyl carbonate or a mixture thereof. For that reason, there arise problems that as charging and discharging are repeated, adhesion to a metal foil as a current collector becomes poor and as a result, increase in internal resistance of a battery occurs and battery performance is lowered. Further an electrode sheet produced by using a polyvinylidene fluoride binder is poor in flexibility, and when the electrode sheet is folded by 180 degrees for producing a square form battery or when wound for producing a small cylindrical form battery, there easily occur a problem that an electrode composition is separated from the electrode sheet, which results in decrease in yield. Also JP-A-4-95363 discloses the use, as a binder, of a material having rubber elasticity and comprising mainly a fluorine-containing copolymer such as vinylidene fluoride-hexafluoropropylene copolymer or vinylidene fluoride-chlorotrifluoroethylene copolymer for the purpose to enhance a binding property against expansion and shrinkage of an active material for positive electrode at the time of charging and discharging of a secondary battery using a non-aqueous electrolyte. However since those copolymers have crystallinity lower than that of polyvinylidene fluoride, they are apt to swell against an organic solvent of a non-aqueous electrolyte as compared with polyvinylidene fluoride and elution thereof occurs depending on kind of a non-aqueous electrolyte. Thus they do not function as a binder. JP-B-8-4007 discloses the use of similar binder such as fluorine-containing high molecular copolymer mainly comprising vinylidene fluoride, tetrafluoroethylene and hexafluoropropylene instead of polyvinylidene fluoride. Claims of that patent publication discloses a copolymer comprising 0.3 to 0.9% by mole of vinylidene fluoride, 0.03 to 0.5% by mole of hexafluoropropylene and 0 to 0.5% by mole of tetrafluoroethylene, in which a total % by mole of those three monomers is from 0.80 to 1. In that patent publication, too, it is pointed out that since polyvinylidene fluoride is soluble only in the above-mentioned specific solvents such as N-methylpyrrolidone, dimethylacetamide, dimethylformamide and methyl sulfoxide which have a high polarity and a high boiling point and some of which are toxic, when an electrode is produced by coating an active material by using the mentioned solvent and then molding, there are problems, from the viewpoint of production process, that it takes too long period of time to dry the solvent having a high boiling point and due to toxicity of the solvent, sealing equipment and exhaust equipment are required. In that patent publication, in order to solve the above-mentioned problems, the mentioned copolymer which dissolves in usual organic solvents costing low and having a low boiling point, for example, ketone solvents such as methyl ethyl ketone and methyl isobutyl ketone, ester solvents such as ethyl acetate and butyl acetate, ether solvents such as dioxane and tetrahydrofuran and a mixture thereof is used for a binder. However, since a degree of swelling of that copolymer is basically large against an organic solvent of non-aqueous electrolyte like the above-mentioned vinylidene fluoride-hexafluoropropylene copolymer and vinylidene fluoride-chlorotrifluoroethylene copolymer, during a long term use of a battery, peeling of a battery electrode composition from a current collector and releasing of an active material occur, which arises a problem with lowering of battery performance.

Further JP-A-7-147156 describes that by using an electrode produced by adhering a composite layer of an insoluble non-melting substrate having a polyacene structure and a specific binder to a metal foil, battery performance is enhanced and, that the binder is a fluorine-containing polymer having a fluorine atom/carbon atom ratio of less than 1.5 and not less than 0.75. However a polymer disclosed in that patent publication is only polyvinylidene fluoride. For example, both ethylene-tetrafluoroethylene copolymer and propylene-tetrafluoroethylene copolymer disclosed therein are insoluble in an organic solvent, and seem not suitable as a binder and not practical from the description in the publication that in order to obtain a uniform electrode, it is preferable that a fluorine-containing polymer is completely dissolved.

An object of the present invention is to provide a binder for secondary battery using non-aqueous electrolyte which has flexibility as compared with polyvinylidene fluoride, is soluble in not only conventional solvents such as N-methylpyrolidone, dimethylacetamide and dimethylformamide but also an organic solvent having a low boiling point such as acetone or methyl ethyl ketone and, as compared with the above-mentioned fluorine-containing copolymer, is less swelling against organic solvents of non-aqueous electrolyte such as propylene carbonate, ethylene carbonate, diethyl carbonate, diethoxyethane and a mixture thereof, and to provide a battery electrode composition which is prepared by using the binder.

DISCLOSURE OF THE INVENTION

The present inventors have found, as a result of their study, that the use of a copolymer mainly comprising vinylidene fluoride and tetrafluoroethylene as a binder for secondary battery using non-aqueous electrolyte makes it possible to simplify production process and reduce production cost, and that since a degree of swelling of the copolymer against the non-aqueous electrolyte lowers, battery performance can be enhanced.

Namely, the present invention relates to the binder for secondary battery using non-aqueous electrolyte, in which the secondary battery comprises a positive electrode produced by adhering a positive electrode composition comprising an active material for positive electrode, conductive agent and binder to a current collector for positive electrode and/or a negative electrode produced by adhering a negative electrode composition comprising an active material for negative electrode and binder to a current collector for negative electrode and a non-aqueous electrolyte, and the binder comprises a copolymer of two monomers comprising 50 to 80% by mole of vinylidene fluoride and 20 to 50% by mole of tetrafluoroethylene.

Also the present invention relates to the binder for secondary battery using non-aqueous electrolyte, which comprises a copolymer of three or more monomers of 50 to 80% by mole of vinylidene fluoride, not less than 17% by mole and less than 50% by mole of tetrafluoroethylene and less than 3% by mole of a monomer copolymerizable therewith.

It is preferable that a molecular weight of the above-mentioned copolymers is larger from the viewpoint of enhancing cycle characteristics. For example, a preferred number average molecular weight of copolymer comprising three or more monomers is from 150,000 to 500,000.

The binder of the present invention is useful particularly in case where a lithium-containing oxide is used as an active material for positive electrode.

Also the present invention relates to the battery electrode composition which contains the binder mentioned above.

BEST MODE FOR CARRYING OUT THE INVENTION

The binder of the present invention is characterized by comprising a vinylidene fluoride-tetrafluoroethylene copolymer, in which a proportion of vinylidene fluoride is from 50 to 80% by mole, preferably from 60 to 80% by mole.

Examples of the binder are copolymer of two monomers comprising 50 to 80% by mole, preferably 60 to 80% by mole of vinylidene fluoride and 20 to 50% by mole, preferably 20 to 40% by mole of tetrafluoroethylene and copolymer comprising three or more monomers of 50 to 80% by mole, preferably 60 to 80% by mole of vinylidene fluoride, not less than 17% by mole and less than 50% by mole, preferably not less than 17% by mole and less than 40% by mole of tetrafluoroethylene and less than 3% by mole, preferably less than 2.8% by mole, further preferably less than 2.5% by mole of monomer copolymerizable therewith.

The vinylidene fluoride copolymer used in the present invention can be prepared by known polymerization methods. Among them, preferable is radical polymerization method. Namely as far as the polymerization is proceeded radically, there is no limit in polymerization means. The polymerization is started with, for example, organic or inorganic radical initiator, heat, light, radioactive ray or the like. Also solution polymerization, bulk polymerization, suspension polymerization, emulsion polymerization, or the like can be employed.

In case where vinylidene fluoride is less than 50% by mole, it is difficult to dissolve the copolymer throughout an organic solvent. On the other hand, if more than 80% by mole, a degree of swelling of the copolymer against electrolytes such as propylene carbonate, ethylene carbonate and diethyl carbonate is increased. As a result, if it is used as the binder in the larger amount, when a battery is used for a long period of time or when used continuously at high temperature, peeling of the battery electrode composition from the current collector and releasing of the active material occur, which results in lowering of battery performance. Further if its amount is more than 80% by mole, dissolution to usual organic solvents having a low boiling point becomes poor, and the specific organic solvent having high boiling point such as N-methylpyrrolidone or dimethylformamide is necessarily used. Therefore, it takes a longer period of time for drying the solvent when producing batteries, and production efficiency cannot be enhanced. Also since the obtained copolymer becomes hard and lacks in flexibility, there is a limit in small circular winding or folding of the electrode sheet and difficulty in enhancing battery performance arises.

A preferred molecular weight of the copolymer comprising two monomers or three or more monomers of the present invention is from 10,000 to 500,000 according to a number average molecular weight measured by GPC (gel permeation chromatography) based on polystyrene conversion. A molecular weight of less than 10,000 is too low to form a film, and when more than 500,000, there is a tendency that pseudoplasticity of the battery electrode composition increases greatly and it becomes difficult to apply the composition to the current collector for electrode. In order to enhance cycle characteristics, it is preferable that the molecular weight is relatively larger. From that point of view, in case of the copolymer comprising, for example, three or more monomers, a preferred molecular weight is from 150,000 to 500,000.

For adhesion of the binder to the current collector, the copolymer of tetrafluoroethylene and vinylidene fluoride suffices. The adhesion can be further enhanced by copolymerizing the monomer copolymerizable with the copolymer in an amount of not impairing excellent swelling property of the copolymer in the non-aqueous electrolyte. The copolymerizable monomer may be added in an amount of less than 3% by mole. If it is added in an amount of not less than 3% by mole, in general there is a tendency that crystallinity of the copolymer of vinylidene fluoride and tetrafluoroethylene is lowered significantly, and as a result, swelling property in non-aqueous electrolyte becomes poor. Examples of the monomer copolymerizable with vinylidene fluoride and tetrafluoroethylene are unsaturated dibasic acid monoesters described in JP-A-6-172452, for example, monomethyl maleate, monomethyl citraconate, monoethyl citraconate, vinylene carbonate and the like; compounds described in JP-A-7-201316 and having hydrophilic polar group such as —$SO_3M$, —$OSO_3M$, —COOM, —$OPO_3M$ (M represents an alkali metal), or amine type polar group such as —$NHR^1$ or —$NR^2R^3$ ($R^1$, $R^2$ and $R^3$ are alkyl groups), for example, $CH_2$=CH—$CH_2$—Y, $CH_2$=C($CH_3$)—$CH_2$—Y, $CH_2$=CH—$CH_2$—O—CO—CH($CH_2COOR^4$)—Y, $CH_2$=CH—$CH_2$—O—$CH_2$—CH(OH)—$CH_2$—Y, $CH_2$=C($CH_3$)—CO—O—$CH_2$—$CH_2$—$CH_2$—Y, $CH_2$=CH—CO—O—$CH_2$—$CH_2$—Y and $CH_2$=CH—CO—NH—C($CH_3$)$_2$—$CH_2$—Y (Y represents a hydrophilic polar group and $R^4$ represents an alkyl group); maleic acid; maleic anhydride; and the like. Further as the copolymerizable monomer, there can be also used hydrated allyl ether monomers such as $CH_2$=CH—$CH_2$—O—$(CH_2)_n$—OH ($3 \leq n \leq 8$),

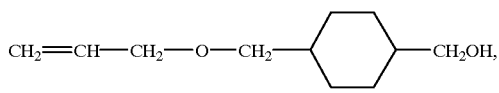

$CH_2$=CH—$CH_2$—O—$(CH_2$—$CH_2$—O)$_n$—H ($1 \leq n \leq 14$) and $CH_2$=CH—$CH_2$—O—$(CH_2$—CH($CH_3$)—O)$_n$—H ($1 \leq n \leq 14$), and carboxylated allyl ether and ester monomers and/or allyl ether and ester monomers substituted by —$(CF_2)_n$—$CF_3$ ($3 \leq n \leq 8$), for example, $CH_2$=CH—$CH_2$—O—CO—$C_2H_4$—COOH, $CH_2$=CH—$CH_2$—O—CO—$C_5H_{10}$—COOH, $CH_2$=CH—$CH_2$—O—$C_2H_4$—$(CF_2)_nCF_3$, $CH_2$=CH—$CH_2$—CO—O—$C_2H_4$—$(CF_2)_nCF_3$, $CH_2$=C($CH_3$)—CO—O—$CH_2$—$CF_3$ and the like. By the way, studies having been made so far made it possible to expect that even by using a compound other than the above-mentioned compound having a polar group, adhesion to the current collector made of aluminum or copper foil can be enhanced by lowering slightly crystallinity of the copolymer of vinylidene fluoride and tetrafluoroethylene and thus endowing the copolymer material with flexibility. Thereby there can be used, for example, unsaturated hydrocarbon monomers ($CH_2$=CHR, in which R is hydrogen, an alkyl group or a halogen such as Cl) such as ethylene and propylene; fluorine-containing monomers such as chlorotrifluoroethylene, hexafluoropropylene and hexafluoroisobutene; $CF_2$=CF—O—$C_nF_{2n+1}$ (n is an integer of 1 or more); $CH_2$=CF—$C_nF_{2n+1}$ (n is an integer of 1 or more); $CH_2$=CF—$(CF_2CF_2)_n$H (n is an integer of 1 or more); and $CF_2$=CF—O—$(CF_2CF(CF_3)O)_m$—$C_nF_{2n+1}$ (each of m and n is an integer of 1 or more). In addition to the above-mentioned compounds, there can be used at least one of fluorine-containing ethylenically unsaturated monomers having a functional group and represented by the formula (1):

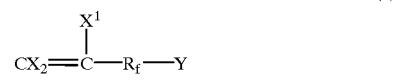

(1)

wherein Y is —$CH_2OH$, —COOH, a carboxylic salt group, a carboxylic ester group or epoxy, X and $X^1$ are the same or different and each is hydrogen atom or fluorine atom, $R_f$ is a divalent fluorine-containing alkylene group having 1 to 40 carbon atoms or a divalent fluorine-containing alkylene group having ether bond and 1 to 40 carbon atoms. By copolymerizing one or two or more of those monomers, adhesion to the current collector is further enhanced, and even if charging and discharging are repeated, the active material of electrode is not peeled off from the current collector and good charging and discharging cycle characteristics can be obtained.

The copolymer mainly comprising vinylidene fluoride and tetrafluoroethylene which is used as the binder for battery of the present invention (hereinafter may be referred to as "vinylidene fluoride-tetrafluoroethylene copolymer") has a lower degree of swelling in the above-mentioned organic electrolyte despite that it is soluble not only in nitrogen-containing organic solvents such as N-methylpyrrolidone, dimethylformamide and dimethylacetamide which are solvents of polyvinylidene fluoride but also usual organic solvents having a low boiling point which are used well in general. Therefore by using such a copolymer, the battery electrode composition and electrode sheet which have flexibility can be obtained.

Examples of the usual organic solvents having a low boiling point are, for instance, ketone solvents such as acetone, methyl ethyl ketone, cyclohexanone and methyl isobutyl ketone; ester solvents such as ethyl acetate and butyl acetate; ether solvents such as tetrahydrofuran and dioxane; and a mixture thereof.

In case where the above-mentioned copolymer is used as a binder, it is usual to disperse and mix electrode materials such as an active material for electrode in a solution in which the copolymer is dissolved. In addition, for example, the composition may be prepared by previously mixing the copolymer powder and a powder of the active material for electrode and then adding the organic solvent thereto. Also the electrode sheet can be produced by heating and melting powders of the copolymer and active material for electrode, extruding with an extrusion molding machine to prepare the composition in the form of thin film and then laminating the film to the current collector coated with the conductive agent and the above-mentioned usual organic solvent. Further the solution of the copolymer may be applied to a preformed active material for electrode. As mentioned above, a method for applying the copolymer as the binder is not limited.

As one of methods for enhancing adhesion of the composition containing the binder comprising the copolymer with the current collector, there is a method of drying the composition coating on the current collector at a temperature of not less than the melting point of the copolymer contained in the binder. However in case of polyvinylidene fluoride which is a conventional binder, JP-A-4-249859 describes that when the composition coating is dried at a relatively high temperature (not less than the temperature of 170° to 180° C. In general, a melting point of polyvinylidene fluoride is around 175° C.), deterioration of polyvinylidene fluoride occurs and as a result, a factor for maintaining a battery capacity of charge and discharge cycle characteristics is lowered. In case of the copolymer used in the present invention, such a problem does not occur by heating and drying treatments, and desired enhancement of adhesion is observed and battery performance is stable.

In the binder of the present invention, in order to further enhance adhesion, a resin such as polymethacrylate, polymethyl methacrylate, polyacrylonitrile, polyimide, polyamide, polyamideimide or polycarbonate may be contained in the above-mentioned copolymer comprising two monomers or three or more monomers. It is preferable that a content of the resin in the binder is not more than about 20% by volume.

Secondary battery for non-aqueous electrolyte to which the binder of the present invention is applied comprises a positive electrode produced by adhering the positive electrode composition comprising the active material for positive electrode, conductive agent and binder to the current collector for positive electrode; a negative electrode produced by adhering the negative electrode composition comprising the active material for negative electrode and binder to the current collector for negative electrode; and the non-aqueous electrolyte.

The present invention also relates to the battery electrode composition which comprises the above-mentioned binder and other electrode materials. As the other electrode materials, there are an active material for positive electrode, active material for negative electrode and conductive agent which are described below.

Examples of the active material for positive electrode which can be used in the present invention are transition metal oxides such as manganese dioxide and vanadium pentoxide; transition metal chalcogenides such as iron sulfide and titanium sulfide; oxide mixtures containing lithium; and the like. Particularly from the viewpoint that high voltage and high energy density can be obtained and charge and discharge cycle characteristics are excellent, preferable are lithium-containing oxides represented by the formula: $Li_XA_{1-Y}M_YO_2$ (A is at least one transition metal element selected from the group consisting of Mn, Co and Ni, M is at least one element selected from the group consisting of B, Mg, Ca, Sr, Ba, Ti, V, Cr, Mn, Fe, Co, Ni, Cu, Al, In, Nb, Mo, W, Y and Rh, $0.05 \leq X \leq 1.1$, $0 \leq Y \leq 0.5$). Examples of desirable oxide are, for instance, lithium cobalt dioxide ($LiCoO_2$), lithium nickel dioxide ($LiNiO_2$), lithium manganese tetraoxide ($LiMn_2O_4$) and the like.

As the active material for negative electrode, there can be used carbonaceous materials being capable of doping/undoping lithium and the like. Examples of the preferred material are, for instance, electrically conductive polymers such as polyacene and polypyrole, cokes, polymer carbon, carbon fiber, and besides, from the viewpoint of a large energy density per unit volume, pyrolitic carbon, cokes (petroleum cokes, pitch cokes, coal cokes and the like), carbon black (acetylene black and the like), vitreous carbon, sintered organic high molecular material (article produced by sintering organic high molecular material at a temperature of not less than 500° C. in inert gas stream or in vacuum), and the like.

Examples of the conductive agent are, for instance, carbonaceous materials, i.e., carbon blacks such as acetylene black and Ketjen black, graphites and the like.

The binder of the present invention is used as the binder in the positive electrode composition and/or the binder in the negative electrode composition, and its amount is from 0.1 to 20% by weight, preferably from 1 to 10% by weight based on the electrode composition. The residual amount is that of the above-mentioned electrode materials.

The current collector for positive electrode, to which the electrode composition is laminated is, for example, an aluminum foil or the like. The current collector for negative electrode is a copper foil or the like.

The non-aqueous electrolyte is not particularly limited. As the organic solvent, there can be used one or two or more of known solvents such as propylene carbonate, ethylene carbonate, butylene carbonate, γ-butyrolactone, 1,2-dimethoxyethane, 1,2-diethoxyethane, dimethyl carbonate and diethyl carbonate. Also there can be used any of known electrolytes such as $LiClO_4$, $LiAsF_6$, $LiPF_6$, $LiBF_4$, LiCl, LiBr, $CH_3SO_3Li$, $CF_3SO_3Li$ and cesium carbonate. The battery electrode composition of the present invention may be used in combination of an acrylic resin such as polymethacrylate or polymethyl methacrylate, a polyimide, polyamide or polyamideimide resin or the like to enhance adhesion to the current collector.

The binder of the present invention is useful not only for lithium ion secondary battery using the above-mentioned liquid electrolyte, as the binder for secondary battery using non-aqueous electrolyte but also for lithium secondary battery using a polymer electrolyte, a polymer electrolyte (so-called high molecular gel electrolyte) being holding an electrolytic solution or electrolyte and taking a role of a separator.

The present invention is then explained based on examples, but is not limited to them.

EXAMPLES 1 TO 9

As shown in Table 1, a copolymer of vinylidene fluoride and tetrafluoroethylene and a terpolymer prepared by copolymerizing those monomers with other copolymerizable monomer for enhancing adhesive property were prepared by usual method. A proportion thereof, and molecular weight and solubility of the copolymer in an organic solvent are shown in Table 1. The results of Comparative Examples 1 to 4 wherein copolymers and polyvinylidene fluoride (VP825 available from DAIKIN INDUSTRIES, LTD.) used are also shown in Table 1.

The solubility in an organic solvent was determined by using 10% by weight of copolymer shown in Table 1 per each solvent at a temperature of from room temperature to 50° C. In the table, ○ represents being soluble, and x represents being insoluble.

TABLE 1

| | Proportion of vinylidene fluoride (% by mole) | Proportion of tetrafluoroethylene (% by mole) | Other copolymerizable monomer | | Number average molecular weight* (Mn × 10⁴) |
|---|---|---|---|---|---|
| | | | Kind | Proportion (% by mole) | |
| Ex. 1 | 65 | 35 | — | 0 | 18.4 |
| Ex. 2 | 70 | 30 | — | 0 | 20.0 |
| Ex. 3 | 75 | 25 | — | 0 | 19.0 |
| Ex. 4 | 63.6 | 36.1 | Monomethyl maleate | 0.3 | 12.8 |
| Ex. 5 | 61.5 | 37.0 | $CF_2=CF(CF_3)$ | 1.5 | 14.0 |
| Ex. 6 | 61.7 | 37.3 | $CF_2=CF-O-C_3F_7$ | 1.0 | 15.0 |
| Ex. 7 | 61.4 | 36.2 | $CF_2=CF(CF_3)$ | 2.4 | 13.0 |
| Ex. 8 | 61.5 | 35.7 | $CF_2=CF(CF_3)$ | 2.8 | 10.0 |
| Ex. 9 | 65 | 32.5 | $CF_2=CF(CF_3)$ | 2.5 | 25 |
| Com. Ex. 1 | 45 (estimated) | 55 (estimated) | — | 0 | unknown |
| Com. Ex. 2 | 90 | 10 | — | 0 | 20.0 |
| Com. Ex. 3 | 100 | 0 | — | 0 | 12.0 |
| Com. Ex. 4 | 61.9 | 35.0 | $CF_2=CF(CF_3)$ | 3.1 | 14.0 |

| | Solubility in organic solvent | | | |
|---|---|---|---|---|
| | NMP | THF | MEK | Acetone |
| Ex. 1 | ○ | ○ | ○ | ○ |
| Ex. 2 | ○ | ○ | ○ | ○ |
| Ex. 3 | ○ | ○ | ○ | ○ |
| Ex. 4 | ○ | ○ | ○ | ○ |
| Ex. 5 | ○ | ○ | ○ | ○ |
| Ex. 6 | ○ | ○ | ○ | ○ |
| Ex. 7 | ○ | ○ | ○ | ○ |
| Ex. 8 | ○ | ○ | ○ | ○ |
| Ex. 9 | ○ | ○ | ○ | ○ |
| Com. Ex. 1 | x | x | x | x |
| Com. Ex. 2 | ○ | x | x | x |
| Com. Ex. 3 | ○ | x | x | x |
| Com. Ex. 4 | ○ | ○ | ○ | ○ |

(NMP: N-Methylpyrrolidone, THF: Tetrahydrofuran, MEK: Methyl ethyl ketone)
*Number average molecular weight based on polystyrene

EXAMPLE 10

A metal die having a diameter of 12 cm was charged with 10 g of copolymer powder of Examples 1 to 9, followed by pressing at 230° C. at a gauge pressure of 15 kg/cm² with a 50-ton press to give a sheet of about 0.5 mm thick. Polyvinylidene fluoride of Comparative Example 3 was press-molded in the same manner as above to give a sheet. Those sheets were cut into strips having a width of 0.5 cm and a length of 3 cm, and a dynamic viscoelasticity was measured (with a meter available from Rheometrics Co., Ltd., Frequency: 3.5 Hz, 25° C.). The results are shown in Table 2.

TABLE 2

| Copolymer | Dynamic viscoelasticity (× 10⁹ dyn/cm²) |
|---|---|
| Ex. 1 | 6.0 |
| Ex. 2 | 8.0 |
| Ex. 3 | 10.0 |
| Ex. 4 | 6.4 |
| Ex. 5 | 5.2 |
| Ex. 6 | 3.8 |
| Ex. 7 | 3.8 |
| Ex. 8 | 3.5 |
| Ex. 9 | 2.3 |
| Com. Ex. 3 | 15.0 |

EXAMPLE 11

The sheets produced in Example 10 by molding copolymers of Examples 1 to 9 were cut into strips having a width of 1 cm and a length of 5 cm, and volumes thereof were measured with a specific gravity meter (DENSI METER available from Toyo Seiki Co., Ltd.). Then the strips were dipped in a propylene carbonate and ethylene carbonate mixture (volume ratio 1:1) heated to 85° C. and an ethylene carbonate and diethyl carbonate mixture (volume ratio 1:1) heated to 85° C., respectively. A volume change ratio (a volume ratio increased by dipping) after 72-hour dipping was measured. The same measurements were made for comparison purpose with respect to strips having the same size and produced from sheets obtained by molding polyvinylidene fluoride and copolymer powder of Comparative Examples 3 to 4 in the same manner as in Example 10 and also with respect to strips having the same size and produced from sheets obtained by molding a fluorine-containing rubber of a terpolymer of vinylidene fluoride (VdF)-tetrafluoroethylene (TFE)-hexafluoropropylene (HFP) (vinylidene fluoride/tetrafluoroethylene/hexafluoropropylene=60/20/20% by mole) in the same manner as in Example 10. The results are shown in Table 3.

TABLE 3

| Electrolyte | Volume change ratio in electrolyte (%) | |
| --- | --- | --- |
| | Propylene carbonate-ethylene carbonate mixture | Ethylene carbonate-diethyl carbonate mixture |
| Ex. 1 | 10 | 18 |
| Ex. 2 | 28 | 36 |
| Ex. 3 | 32 | 40 |
| Ex. 4 | 20 | 23 |
| Ex. 5 | 23 | 24 |
| Ex. 6 | 21 | 30 |
| Ex. 7 | 27 | 33 |
| Ex. 8 | 39 | 45 |
| Ex. 9 | 40 | 45 |
| Com. Ex. 3 | 40 | 46 |
| Com. Ex. 4 | 50 | Large swelling (unmeasurable) |
| VdF-TFE-HFP terpolymer | 75 | Dissolved |

EXAMPLE 12

Production of Negative Electrode

Sixty parts by weight of carbon black as an active material for negative electrode, 5 parts by weight each of polymer of Example 1 (copolymer), Examples 4 to 6 and 9 (terpolymer) or polyvinylidene fluoride of Comparative Example 3 as a binder and 35 parts by weight of N-methylpyrrolidone, methyl ethyl ketone or tetrahydrofuran as a solvent were mixed for 10 hours by using a ball mill to give a negative electrode composition. The composition was coated on both surfaces of copper foil of 10 μm thick which would become a current collector for negative electrode, so that a thickness after drying became 100 μm. Finally the coated copper foil was dried at 120° C. and then rolled to give a negative electrode strip.

Production of Positive Electrode

Sixty parts by weight of $LiCoO_2$ as an active material for positive electrode, 5 parts by weight of acetylene black as a conductive agent, 5 parts by weight each of polymer of Example 1 (copolymer), Examples 4 to 6 and 9 (terpolymer) or polyvinylidene fluoride of Comparative Example 3 as a binder and 30 parts by weight of N-methylpyrrolidone, methyl ethyl ketone or tetrahydrofuran as a solvent were mixed for 10 hours by using a ball mill to give a positive electrode composition. The composition was coated on both surfaces of aluminum foil of 20 μm thick which would become a current collector for positive electrode, so that a thickness after drying became 100 μm. Finally the coated aluminum foil was dried at 120° C. and then rolled to give a positive electrode strip.

Production of Battery

A battery was produced according to the method described in JP-A-7-201316 by using the negative electrode strip and the positive electrode strip which were produced in the manner mentioned above.

Namely the above-mentioned positive electrode strip and negative electrode strip were laminated through a 25 μm thick polypropylene film which was a separator, and the laminated article was wound plural times to give a spiral electrode having an outside diameter of 18 mm. The spiral electrode was put in a battery container made of nickel-plated iron, and insulating sheets were provided on the top and bottom of the spiral electrode. An aluminum lead wire for positive electrode was led out from the current collector for positive electrode and welded to a battery cap, and a nickel lead wire for negative electrode was led out from the current collector for negative electrode and welded to the battery container.

To the battery container in which the spiral electrode was put was filled a non-aqueous electrolyte prepared by dissolving $LiPF_6$ at a concentration of 1 mole/liter in a solvent comprising ethylene carbonate and diethyl carbonate at a volume ratio of 1:1. Then a safety valve having a current shut-off mechanism and a battery cap were caulked and fixed to the battery container via an insulating sealing gasket of which surface was coated with asphalt. Thus cylindrical secondary batteries having a diameter of 18 mm and a height of 65 mm and using a non-aqueous electrolyte were produced (Those batteries are represented by A to P in Table 4).

With respect to the secondary batteries so-produced by using a non-aqueous electrolyte, charging was carried out for 2.5 hours at room temperature under the conditions of 4.2 V of maximum charge voltage and 1 A of charge current and then discharging was carried out at 6.2 Ω of a constant resistance. Thus charge and discharge cycles were repeated and a change in discharge capacity was measured to determine the number of cycles, in which discharge capacity lowers to 50% of initial capacity (number of cycles at 50% discharge capacity). The results are shown in Table 4.

TABLE 4

| Battery No. | Kind of binder | Kind of solvent | Number of cycles at 50% discharge capacity |
| --- | --- | --- | --- |
| A | Example 1 | N-methylpyrrolidone | 607 |
| B | Same as above | Methyl ethyl ketone | 625 |
| C | Same as above | Tetrahydrofuran | 600 |
| D | Example 4 | N-methylpyrrolidone | 610 |
| E | Same as above | Methyl ethyl ketone | 595 |
| F | Same as above | Tetrahydrofuran | 622 |
| G | Example 5 | N-methylpyrrolidone | 606 |
| H | Same as above | Methyl ethyl ketone | 680 |
| I | Same as above | Tetrahydrofuran | 692 |
| J | Example 6 | N-methylpyrrolidone | 694 |
| K | Same as above | Methyl ethyl ketone | 601 |
| L | Same as above | Tetrahydrofuran | 611 |
| M | Example 9 | N-methylpyrrolidone | 750 |
| N | Com. Ex. 3 | N-methylpyrrolidone | 510 |
| O | Same as above | Methyl ethyl ketone | * |
| P | Same as above | Tetrahydrofuran | * |

*Polyvinylidene fluoride of Comparative Example 3 was not dissolved in solvents other than N-methylpyrrolidone, and a coating composition could not be prepared.

As is clear from the results of Table 4, as compared with Batteries N to P produced by using polyvinylidene fluoride as the binder, the number of cycles at 50% capacity of Batteries A to M produced by using the vinylidene fluoride-tetrafluoroethylene copolymer was large, and good charge and discharge cycle characteristics were exhibited. It can be considered that the reason why the cycle characteristic of Battery M was particularly good is that since the copolymer having a larger number average molecular weight as compared with other copolymers was used as the binder, adhesion of the electrode composition with the aluminum foil or copper foil which was the current collector was further enhanced.

From the above-mentioned results, it is seen that the use of vinylidene fluoride-tetrafluoroethylene copolymer, particularly copolymer having a relatively large number average molecular weight as the binder is useful for enhancing charge and discharge cycle characteristics of batteries.

EXAMPLE 13

Production of Negative Electrode

The same procedures as in Example 12 were repeated to make a negative electrode strip except that N-methylpyrrolidone was used as the solvent for the binder and the drying temperature of the composition was changed to 190° C.

Production of Positive Electrode

The same procedures as in Example 12 were repeated to make a positive electrode strip except that N-methylpyrrolidone was used as the solvent for the binder and the drying temperature of the composition was changed to 190° C.

Production of Battery

Secondary batteries using a non-aqueous electrolyte were produced in the same manner as in Example 12 by using the thus produced negative electrode strip and positive electrode strip (Those batteries are represented by Q to U in Table 5), and the tests (number of cycles at 50% discharge capacity) were carried out in the same manner as in Example 12. The results are shown in Table 5.

TABLE 5

| Battery No. | Kind of binder | Number of cycles at 50% discharge capacity |
| --- | --- | --- |
| Q | Example 1 | 634 |
| R | Example 4 | 606 |
| S | Example 5 | 595 |
| T | Example 6 | 612 |
| U | Com. Ex. 3 | 452 |

As is clear from the results of Table 5, as compared with Battery U produced by using polyvinylidene fluoride as the binder, the number of cycles at 50% discharge capacity of Batteries Q to T produced by using the vinylidene fluoride-tetrafluoroethylene copolymer was large, and good charge and discharge cycle characteristics were exhibited.

From the above-mentioned results, it is seen that the use of the vinylidene fluoride-tetrafluoroethylene copolymer as the binder is useful for enhancing charge and discharge cycle characteristics of batteries.

INDUSTRIAL APPLICABILITY

According to the present invention, there can be obtained the binder for secondary battery using non-aqueous electrolyte which has flexibility as compared with conventional polyvinylidene fluoride, is soluble in not only conventional solvents such as N-methylpyrrolidone, dimethylacetamide and dimethylformamide but also usual organic solvents such as acetone and methyl ethyl ketone having a low boiling point, and is less swelling against an organic solvent of non-aqueous electrolyte as compared with conventional fluorine-containing copolymers or terpolymers, and the battery electrode composition can be obtained. As a result, in view of battery production, simplification of production facilities and increase in yield can reduce production cost, and in view of battery performance, the battery having large number of cycles at 50% discharge capacity and exhibiting good charge and discharge cycle characteristics can be provided.

What is claimed is:

1. A binder for secondary battery produced by using non-aqueous electrolyte, in which the secondary battery comprises a positive electrode produced by adhering a positive electrode composition comprising an active material for positive electrode, conductive agent and binder to a current collector for positive electrode and/or a negative electrode produced by adhering a negative electrode composition comprising an active material for negative electrode and binder to a current collector for negative electrode and a non-aqueous electrolyte; the binder comprising a copolymer consisting essentially of 50 to 80% by mole of vinylidene fluoride and 20 to 50% by mole of tetrafluoroethylene.

2. The binder for secondary battery produced by using non-aqueous electrolyte of claim 1, in which the binder contained in said positive electrode composition and/or negative electrode composition comprises a copolymer consisting essentially of 50 to 80% by mole of vinylidene fluoride, not less than 17% by mole and less than 50% by mole of tetrafluoroethylene and less than 3% by mole of one or more monomers copolymerizable therewith.

3. The binder for secondary battery produced by using non-aqueous electrolyte of claim 2, wherein a number average molecular weight of said copolymer is from 150,000 to 500,000.

4. The binder for secondary battery produced by using non-aqueous electrolyte of claim 1, wherein the active material for positive electrode is a lithium-containing oxide.

5. A battery electrode composition which contains the binder for secondary battery produced by using non-aqueous electrolyte of claim 1.

6. A secondary battery produced by using non-aqueous electrolyte, which contains the battery electrode composition of claim 5.

7. The binder for secondary battery produced by using non-aqueous electrolyte of claim 2, wherein the active material for positive electrode is a lithium-containing oxide.

8. The binder for secondary battery produced by using non-aqueous electrolyte of claim 3, wherein the active material for positive electrode is a lithium-containing oxide.

9. A battery electrode composition which contains the binder for secondary battery produced by using non-aqueous electrolyte of claim 2.

10. A battery electrode composition which contains the binder for secondary battery produced by using non-aqueous electrolyte of claim 3.

11. A battery electrode composition which contains the binder for secondary battery produced by using non-aqueous electrolyte of claim 7.

12. A battery electrode composition which contains the binder for secondary battery produced by using non-aqueous electrolyte of claim 8.

13. A secondary battery produced by using non-aqueous electrolyte, which contains the battery electrode composition of claim 9.

14. A secondary battery produced by using non-aqueous electrolyte, which contains the battery electrode composition of claim 10.

15. A secondary battery produced by using non-aqueous electrolyte, which contains the battery electrode composition of claim 11.

16. A secondary battery produced by using non-aqueous electrolyte, which contains the battery electrode composition of claim 12.

* * * * *